Aug. 30, 1932.  E. O. BARSTOW ET AL  1,874,735
PROCESS OF DEHYDRATING MAGNESIUM CHLORIDE
Filed June 24, 1929
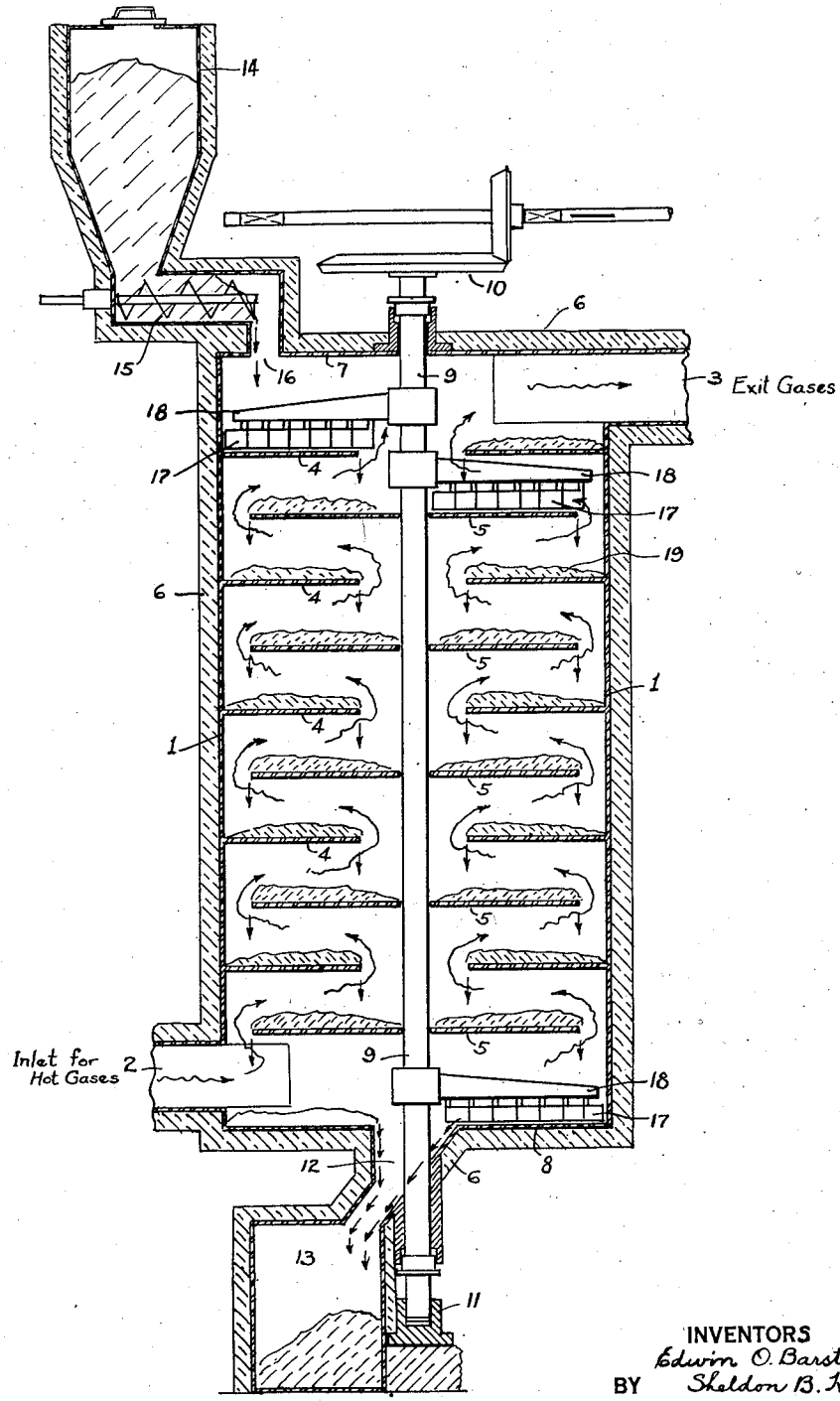
INVENTORS
Edwin O. Barstow and
BY   Sheldon B. Heath
Thomas Griswold, Jr.
ATTORNEY Patented Aug. 30, 1932

1,874,735

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

PROCESS OF DEHYDRATING MAGNESIUM CHLORIDE

Application filed June 24, 1929. Serial No. 373,108.

The present invention relates to the dehydration of magnesium chloride and has particular regard to a continuous process for drying hydrated magnesium chloride containing at least 4, but less than 6, molecules of water of crystallization to a product containing less than 2 molecules of water.

A process of the present general character has been described in U. S. Patent 1,479,982 to Collings and Gann which consists briefly in drying the normal hydrated salt, $MgCl_2.6H_2O$, in air, first at a low temperature (about 95° to 110° C.) and then at a moderate temperature (about 130° to 170° C.), and finally completing dehydration by heating the partially dehydrated material in an atmosphere of hydrochloric acid. In the low temperature heating stage the hexahydrate, $MgCl_2.6H_2O$, which has a melting point of 117° C., is dried to the tetrahydrate, $MgCl_2.4H_2O$. The operation demands rather delicate control in order to avoid incipient fusion of the crystals, which, should it occur, would greatly interfere with proper drying, and the time required is excessively long owing to the slow rate of heating necessary to avoid danger of fusing the crystals. The tetrahydrate has a materially higher melting point, viz. 180° C., and when this intermediate product has been formed the remainder of the drying process can be carried out at a much more rapid rate. The air-dried product having essentially the composition of the dihydrate, $MgCl_2.2H_2O$ then undergoes a final stage of dehydration in an atmosphere of hydrochloric acid, whereby a substantially anhydrous salt is obtained.

The foregoing process, particularly when the consecutive steps are to be carried out continuously, suffers from two disadvantages, due to (1) the length of time required to dry the hexahydrate to the tetrahydrate and (2) the practical difficulties of removing as much as 2 molecules of water of crystallization in an atmosphere of hydrochloric acid.

In order to overcome the first mentioned disadvantage it has been proposed in U. S. Patent 1,557,660 to Cottringer and Collings to mix equivalent amounts of the hexahydrate and dihydrate to make a mixture of average composition of the tetrahydrate, which mixture can then be dried to the dihydrate with greater facility than the hexahydrate alone. Such procedure, however, involves the return of one half of the dihydrate obtained which, in turn, means repeatedly drying and redrying such quantity of material with resultant waste of the heat thereby consumed, as well as a cumulative loss of material due to a slight amount of decomposition occurring at each repetition of the operation.

A better expedient is afforded in a method described in the patent application of A. K. Smith, Serial No. 280,662, filed May 25, 1928, wherein the hexahydrate is heated in a molten condition and thereby further evaporated at temperatures up to 193° C. to form the tetrahydrate, or a product of intermediate water content between the hexahydrate and tetrahydrate. Such product is then formed into small solid particles by flaking, granulating or similar methods, and the solidified particles may be further dried as in the original process.

The second disadvantage before mentioned may be offset in large part by employing the method of air-drying the dihydrate described in the patent application of A. K. Smith and W. R. Veazey Serial No. 372,796, filed June 21, 1929, whereby such dihydrate is heated in a current of inert gas, such as air or the products of the combustion of fuel, at temperatures between about 220° and 300° C. to yield a product having a composition varying from that of the monohydrate to an end-product consisting of a mixture of anhydrous magnesium chloride and basic chloride, which mixture, now containing only the equivalent of from about ½ to 1 molecule of water is then converted to a substantially pure anhydrous magnesium chloride by heating in an atmosphere of hydrochloric acid.

We have now found that, by combining into substantially a single step various operations included within the procedure of the two applications just named, we are able to prepare thus in a particularly direct and expeditious manner an end-product containing the equivalent of one molecule of water or less. In such way we avoid the difficulties attaching to the original process of Collings and Gann, and, by a simplified procedure over those of the two applications, we prepare a product of minimum water content which is most readily convertible to anhydrous magnesium chloride by treatment with hydrochloric acid.

To the accomplishment of the foregoing and related ends the invention, then, consists of the method hereinafter fully described and particularly pointed out in the claims, the annexed drawing and following description setting forth in detail various ways in which the principle of the invention may be used.

In said annexed drawing:—

The single figure therein represents a preferred form of air dryer adapted to be used in our improved method or process.

In carrying out our improved process we employ preferably a mechanical shelf dryer through which a voluminous current of gaseous products of the combustion of fuel is passed upwardly in countercurrent to a descending stream of partially hydrated salt in flake or other suitable divided form. The material fed to the dryer preferably consists of a preconcentrated salt containing four or more, but less than six, molecules of water of crystallization. For example, a material prepared by evaporating a solution of magnesium chloride to a temperature of approximately 190° C. and then flaking the fused salt, which contains the equivalent of about 4.4 moles of water of crystallization, has been found well adapted for the purpose. The inlet gas temperature to the dryer may vary between 200° and 500° C., and the exit gas temperature between about 100° and 200° C. The feed is introduced to the top shelf of the dryer and is mechanically forwarded successively from one shelf to the next lower and is discharged at the bottom. The salt is progressively dehydrated as it descends, and by suitable regulation of the rate of feed and the volume and temperature of the heating gases the dried product is discharged at a temperature of from 220° to 300° C. and having a combined water content corresponding to about 1 molecule of water or less.

Although there are known to exist a number of definite intermediate stages of hydration of magnesium chloride, corresponding to the tetrahydrate, dihydrate and monohydrate, through each of which the material passes as it undergoes dehydration, the operation of our improved processes practically combines all such stages into one without segregating the product of any intermediate stage.

Referring to the drawing, the dryer comprises a vertical cylindrical steel shell 1 covered by a layer of heat insulating material 6. Enclosed therein is a plurality of superposed shelves 4 and 5, supported by the shell and provided with openings alternately at the periphery and at the center for forwarding the material being dried from one shelf to the next lower shelf. A central rotatable shaft 9, connected at its upper end through bevel gears 10 to a source of power and supported at its lower end by thrust bearing 11, carries rake arms 18 fitted with adjustable rabbles or vanes 17, at least one such arm being provided for each shelf but only those for the upper and lower shelves being shown. The heating gases enter at 2, pass upwardly through the peripheral and central openings of the shelves 4 and 5, which act as baffles, and leave through exit passage 3. The material to be dried is charged into a storage hopper 14, whence it is forwarded in a regulated stream by means of screw feeder 15 through a port 16 to the topmost shelf of the dryer. The rabbles or vanes 17 carried by the revolving arms 18 are set and adjusted to forward the material, indicated at 19, at a predetermined rate toward the center and the periphery, respectively, of each alternate shelf, whence it falls through the opening to the next lower shelf. The dried material is discharged from the last shelf through passage 12 into a suitable closed receiver 13.

The heating gases may be produced by combustion of any desired fuel, whether coal, coke, oil or gas, although a fuel low in hydrogen and hence giving combustion gases of a low water vapor content is particularly advantageous. The temperature of the gas entering the dryer may be controlled by admixing air with the furnace gases, thermostatic damper and furnace controls of known type being desirably installed for maintaining the proper conditions automatically.

As the material travels downward from shelf to shelf the composition thereof may be observed by withdrawing samples through sampling holes provided therefor in the dryer wall. By means of samples and temperature readings taken at the same time the progress of the dehydration at any shelf is indicated. Conditions are to be controlled so that incipient fusion and coalescing or caking of the material is avoided. The rate of material feed, and of gas flow, as well as the temperature of the heating gases, are to be adjusted to maintain a dehydratiton rate such that no fusion of hydrated salts occurs at any point, and the discharged material has the desired composition, whether corresponding to the monohydrate or to a still lower water content.

The transitions from one stage of hydration to the next lower stage naturally take place in the same manner as though each stage were carried out separately. Our improved process, however, dispenses with a stagewise separation of intermediate products and permits of continuous dehydration at an approximately uniform rate throughout. By utilizing as raw material a hydrated salt containing less than 6 molecules of water of crystallization, which is readily prepared in the manner described, the time-consuming initial stage of drying that attaches to the use of the hexahydrate salt as starting material is avoided. Then by employing a voluminous current of air of low moisture content at a temperature such that the salt is heated toward the end of the process to a temperature materially above 220° C., the final drying may be carried to the point where not more than one half as much crystal water remains in the dried product as in the product made by processes heretofore practiced, thus making possible the final dehydration in an atmosphere of hydrochloric acid simpler and less costly owing to the smaller volume of water to be removed in such final operation.

While we prefer to make use of a continuous type of shelf dryer, as herein described, other types of apparatus may be employed, if desired, such as a rotary type of dryer. However, we have found that the former has advantages in being easily constructed, requiring but little power to operate, representing a moderate investment and having need for but slight repairs.

In all cases where a certain hydrate or a salt possessing a certain degree of hydration is mentioned herein, we do not limit ourselves to one containing exactly the amount of water of crystallization stated, but have used such terms merely to indicate the approximate degree of hydration of such mentioned material.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of dehydrating magnesium chloride which comprises continuously forwarding a body of hydrated magnesium chloride in subdivided form and containing initially at least 4 but less than 6 molecules of water of crystallization in a heating zone wherein the same is intimately contacted with an oppositely flowing current of hot combustion gases introduced at a temperature not materially in excess of 500° C., and maintaining a rate of flow of said chloride relative to that of said gases to heat the chloride to a temperature approximating 300° C. and discharging the dried product containing between ½ and 1 molecule of combined water.

2. A process of dehydrating magnesium chloride which comprises air-drying a body of hydrated magnesium chloride in subdivided form containing initially at least 4 but less than 6 molecules of water of crystallization by contacting the same with a current of hot combustion gases, maintaining a rate of flow of said chloride relative to that of said gases to heat the chloride to a temperature approximating 300° C., and discharging the dried product having a water content not materially exceeding 1 molecule of combined water.

3. A process of dehydrating magnesium chloride which comprises causing a body of hydrated magnesium chloride in subdivided form containing initially at least 4 but less than 6 molecules of water of crystallization to traverse a heating zone in countercurrent to a stream of hot combustion gases, maintaining a rate of flow of said chloride relative to that of said gases to heat the chloride to a temperature approximating 300° C., and discharging the dried product having a water content not materially exceeding 1 molecule of combined water.

Signed by us this 19 day of June, 1929.
EDWIN O. BARSTOW.
SHELDON B. HEATH.